(12) United States Patent
Hatano

(10) Patent No.: US 7,154,263 B2
(45) Date of Patent: Dec. 26, 2006

(54) ROTATION ANGLE DETECTOR

(75) Inventor: Yoichi Hatano, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/288,286

(22) Filed: Nov. 29, 2005

(65) Prior Publication Data
US 2006/0152214 A1 Jul. 13, 2006

(30) Foreign Application Priority Data
Jan. 12, 2005 (JP) ............... 2005-004780

(51) Int. Cl.
*G01B 7/30* (2006.01)
(52) U.S. Cl. .............................. 324/207.25
(58) Field of Classification Search ............ 324/207.25
See application file for complete search history.

(56) References Cited
U.S. PATENT DOCUMENTS
2004/0145364 A1* 7/2004 Onishi et al. ............ 324/207.2

FOREIGN PATENT DOCUMENTS
JP 2004-271427 9/2004

* cited by examiner

*Primary Examiner*—Edward Lefkowitz
*Assistant Examiner*—David M. Schindler
(74) *Attorney, Agent, or Firm*—Steptoe & Johnson LLP

(57) ABSTRACT

Disclosed here is a rotation angle detector capable of detecting unusual value as a rotation angle so as not to output incorrect data. According to the rotation angle detector of the present invention, the first detector, the second detector, and the auxiliary detector rotate at a different speed. Receiving each detecting signal from i) the first and second rotation-detecting sections; ii) the second rotation-detecting section and the auxiliary rotation-detecting section; and iii) the first rotation-detecting section and the auxiliary rotation-detecting section, the controller calculates at least two tentative values for determining the rotation angle of the rotator. When the calculation values are within a predetermined range, the controller determines the detecting signal from the first and second rotation-detecting sections to be the rotation angle of the rotator.

2 Claims, 3 Drawing Sheets

ROTATION ANGLE DETECTOR

CLAIM OF PRIORITY

This application claims priority under 35 USC 119 to Japanese Patent Application No. 2005-0047980, filed on Jan. 12, 2005, the entire content of which is hereby incorporated by reference.

1. Field of the Invention

The present invention relates to a rotation angle detector used for detecting a rotation angle of a rotatable object, such as a steering wheel (hereinafter referred to as a steering) of a car.

2. Background Art

To keep with pace recent advances in high performance car technology, various devices for detecting a rotation angle of the steering of a car have been introducing.

Here will be described a conventional rotation angle detector with reference to FIG. 4 and FIG. 5. FIG. 4 is a plan view of a conventional rotation angle detector, and FIG. 5 is a section view of the detector. The rotation angle detector shown in FIGS. 4 and 5 is structured below. Rotator 1 has spur gear 1A on the perimeter, and engaging section 1B disposed at the center to have engagement with the shaft of the steering (not shown) that runs through rotator 1. First detector 2 has spur gear 2A on the perimeter that meshes with spur gear 1A of rotator 1. Magnet 3 is attached to the center of detector 2 by insert molding or the like.

Second detector 4 has spur gear 4A on the perimeter that meshes with spur gear 2A of detector 2. Magnet 5 is attached to the center of detector 4. Rotator 1 has the largest diameter and number of teeth, second detector 4 comes to next, and then first detector 2 follows. Wiring board 6 is disposed above first detector 2 and second detector 4 so as to be substantially parallel to them. A plurality of wiring patterns (not shown) is formed on both surfaces of wiring board 6. On wiring board 6, magnetic sensor 7 is fixed at a section that faces magnet 3 of first detector 2; similarly, magnetic sensor 9 is fixed at a section that faces magnet 5 of second detector 4.

First rotation-detecting section 8 is formed of magnet 3 and magnetic sensor 7 facing magnet 3. Second rotation-detecting section 10 is formed of magnet 5 and magnetic sensor 9 facing magnet 5. Wiring board 6 has controller 11 that is formed of electronic components including a microcomputer. Controller 11 is connected to magnetic sensors 7 and 9.

Such structured conventional rotation angle detector is attached to a car in such a way that controller 11 is connected to electronic circuits (not shown) of a car via a connector (not shown) and the steering shaft is inserted through engaging section 1B of rotator 1.

As a driver rotates the steering during driving the detector-mounted car, rotator 1 rotates, and first and second detectors 2 and 4 rotate, since they have a meshing engagement, together with magnet 3 and 5 fixed at the center of each detector. Through the rotation, magnetic lines of force of magnets 3 and 5 change the direction, which are detected by magnetic sensors 7 and 9, respectively. The signals detected by the sensors are transmitted to controller 11. Due to the difference in number of teeth and therefore different rotation speed of first detector 2 and second detector 4, the signal detected at first rotation-detecting section 8 and the signal detected at second rotation-detecting section 10 are different with each other in periodicity and phase.

Controller 11 carries out a predetermined calculation from the two different detecting signals and each number of teeth of the detectors and determines the rotation angle of rotator 1, i.e., of the steering. The data on the rotation angle is sent to the electronic circuits of the car body for driving control. For example, Japanese Patent Unexamined Publication No. 2004-271427 introduces the aforementioned structure of a conventional rotation angle detector.

According to the conventional rotation angle detector, however, if problems occur, for example, breakage in the gears of rotator 1, first detector 2, or second detector 4, coming-off in each mesh engagement, failures in first and second rotation-detecting sections 8 and 10, controller 11 can carry out incorrect calculation from incorrect data and output an abnormal value of the rotation angle.

SUMMARY OF THE INVENTION

It is an object of the present invention to provide a rotation angle detector capable of detecting an invalid rotation angle so as not to output abnormal data.

The rotation angle detector of the present invention contains a rotator; first and second detectors; first and second rotation-detecting sections; an auxiliary detector; an auxiliary rotation-detecting section; and a controller. The rotator rotates as an object to be detected the rotation angle rotates; the first detector rotates as the rotator rotates; and the second detector rotates as the first detector rotates. The first rotation-detecting section detects the rotation of the first detector; similarly, the second rotation-detecting section detects the rotation of the second detector. The auxiliary detector rotates as the rotator rotates. The auxiliary rotation-detecting section detects the rotation of the auxiliary detector. The controller receives detecting signals fed from the first and second rotation-detecting sections and determines the rotation angle of the rotator.

The first, second, and auxiliary detectors rotate at a different speed. The controller calculates at least two tentative rotation angles from the detecting signals i) of the first and second rotation-detecting sections; ii) of the second rotation-detecting section and the auxiliary rotation-detecting section; and iii) of the first rotation-detecting section and the auxiliary rotation-detecting section. When the calculated values are in a predetermined range, the controller determines the rotation angle calculated from the signal of the first and second rotation-detecting sections to be valid.

The controller determines that the detectors and rotation-detecting sections function normally as long as at least two calculated values are in a predetermined range, and outputs the rotation angle. With the simple structure above, the rotation angle detector can check the calculated values for being valid or invalid so as not to output abnormal data.

Modifications may be made in the present invention; for example, when any one of the tentative calculated values does not fall within the specified range, the controller outputs a warning signal so as to alarm the driver that something wrong in the rotation angle detector.

DETAILED DESCRIPTION OF THE INVENTION

Figure 1:
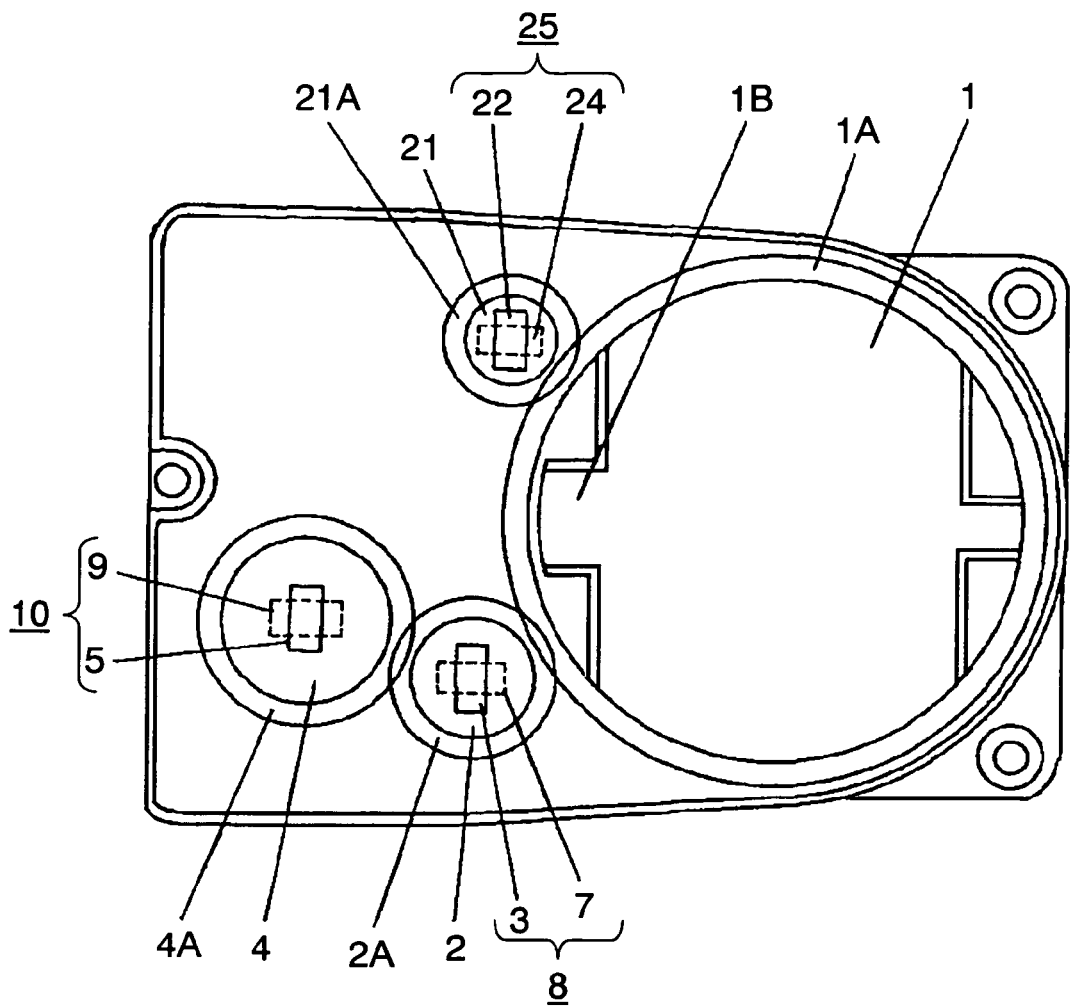
FIG. 1 is a plan view illustrating a rotation angle detector of an exemplary embodiment of the invention.
Figure 2:
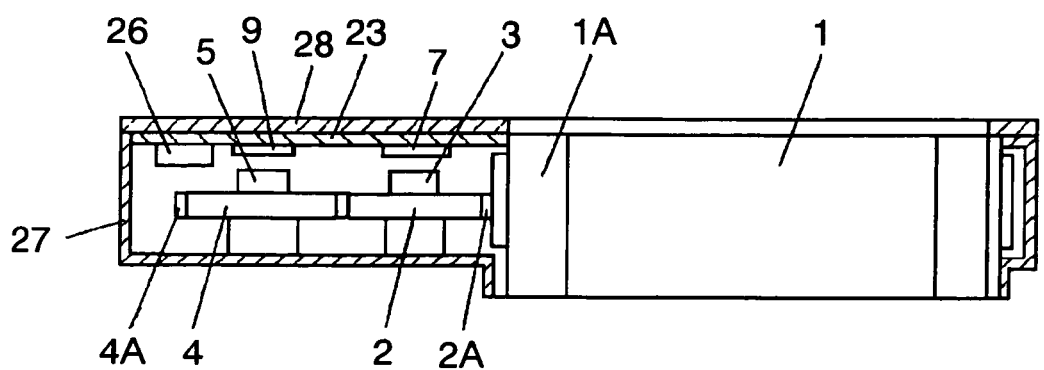
FIG. 2 is a section view of the rotation angle detector.

An exemplary embodiment of the present invention is described hereinafter with reference to the accompanying drawings. In the drawings, like parts are identified by the same reference marks as in the structure described in Background Art, and a detailed explanation thereof will be omitted. FIG. 1 is a plan view of a rotation angle detector of an exemplary embodiment, and FIG. 2 is a section view of the detector. The rotation angle detector of the present invention, as shown in FIGS. 1 and 2, is structured as follows. Rotator 1 is made of insulating resin or metal. Rotator 1 has spur gear 1A on the perimeter, and engaging section 1B at the center to have a mesh engagement with the shaft of the steering (not shown) that runs through the center. First detector 2 is made of insulating resin or metal. First detector 2 has spur gear 2A on the perimeter, which has a mesh engagement with spur gear 1A of rotator 1. Similarly, insulating resin or metal-made second detector 4 has spur gear 4A on the perimeter, which has a mesh engagement with spur gear 2A of first detector 2. With the structure above, first detector 2 and second detector 4 rotate as rotator 1 rotates.

Auxiliary detector 21 is made of insulating resin or metal. Auxiliary detector 21 has spur gear 21A on the perimeter that has a mesh engagement with spur gear 1A of rotator 1, so that auxiliary detector 21 rotates as rotator 1 rotates. Rotator 1 has the largest diameter and number of teeth, second detector 4 comes to next, then first detector 2 follows, and auxiliary detector 21 has the smallest.

The spur gears of the rotator and detectors have different number of teeth: 87 for spur gear 1A; 30 for spur gear 4A; 29 for spur gear 2A; and 28 for spur gear 21A. The difference in number of teeth affects the rotating speed; rotator 1 is the slowest, second detector 4 comes to next, then first detector 2 follows, and auxiliary detector 21 is the fastest.

First detector 2, second detector 4, and auxiliary detector 21 have magnets 3, 5, and 22, respectively, at the center of each top surface. Wiring board 23, which is disposed above first detector 2, second detector 4, and auxiliary detector 21 so as to be parallel to them, has a plurality of wiring patterns (not shown) on both surfaces. Magnetic detecting elements 7, 9, and 24, which are formed of an anisotropic magnetic resistance element (hereinafter, an AMR element), are disposed at positions on wiring board 23 that face magnets 3, 5, and 22, respectively.

Magnet 3 and oppositely positioned magnetic detecting element 7 form first rotation-detecting section 8; similarly, magnet 5 and oppositely positioned magnetic detecting element 9 form second rotation-detecting section 10; further, magnet 22 and oppositely positioned magnetic detecting element 24 form auxiliary rotation-detecting section 25. On the other hand, wiring board 23 contains controller 26, which is formed of electronic components including a microcomputer, is connected to magnetic detecting elements 7, 9, and 24. Insulating resin-made case 27 and cover 28 accommodate rotator 1, first and second detectors 2 and 4, auxiliary detector 21 so as to be rotatable, and wiring board 23 fixed at a place therein.

The rotation angle detector structured above is attached to a car in such a way that the steering shaft is inserted through engaging section 1B of rotator 1, and controller 26 is connected via a connector (not shown) to the electronic circuits (not shown) in the car body.

When the steering is rotated during driving, i.e., during the state in which power is supplied to the rotation angle detector, rotator 1 rotates with the rotation of the steering. The rotation of rotator 1 rotates first detector 2 having spur gear 2A and auxiliary detector 21 having spur gear 21A, both of which engage with spur gear 1A around the perimeter of rotator 1. The rotation of first detector 2 further rotates second detector 4 having spur gear 4A that engages with spur gear 2A of first detector 2.

Figure 3:
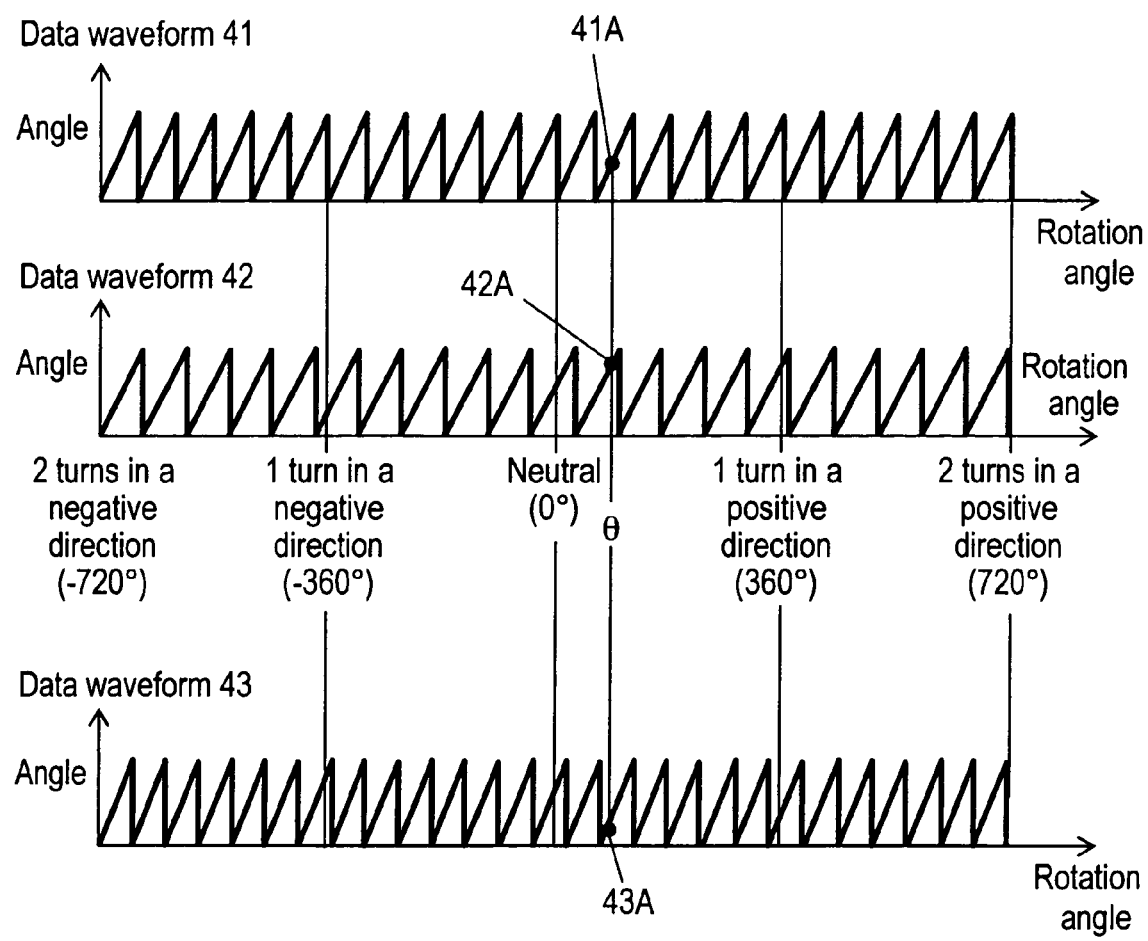
FIG. 3 shows waveforms of the signals detected by the rotation angle detector.
Figure 4:
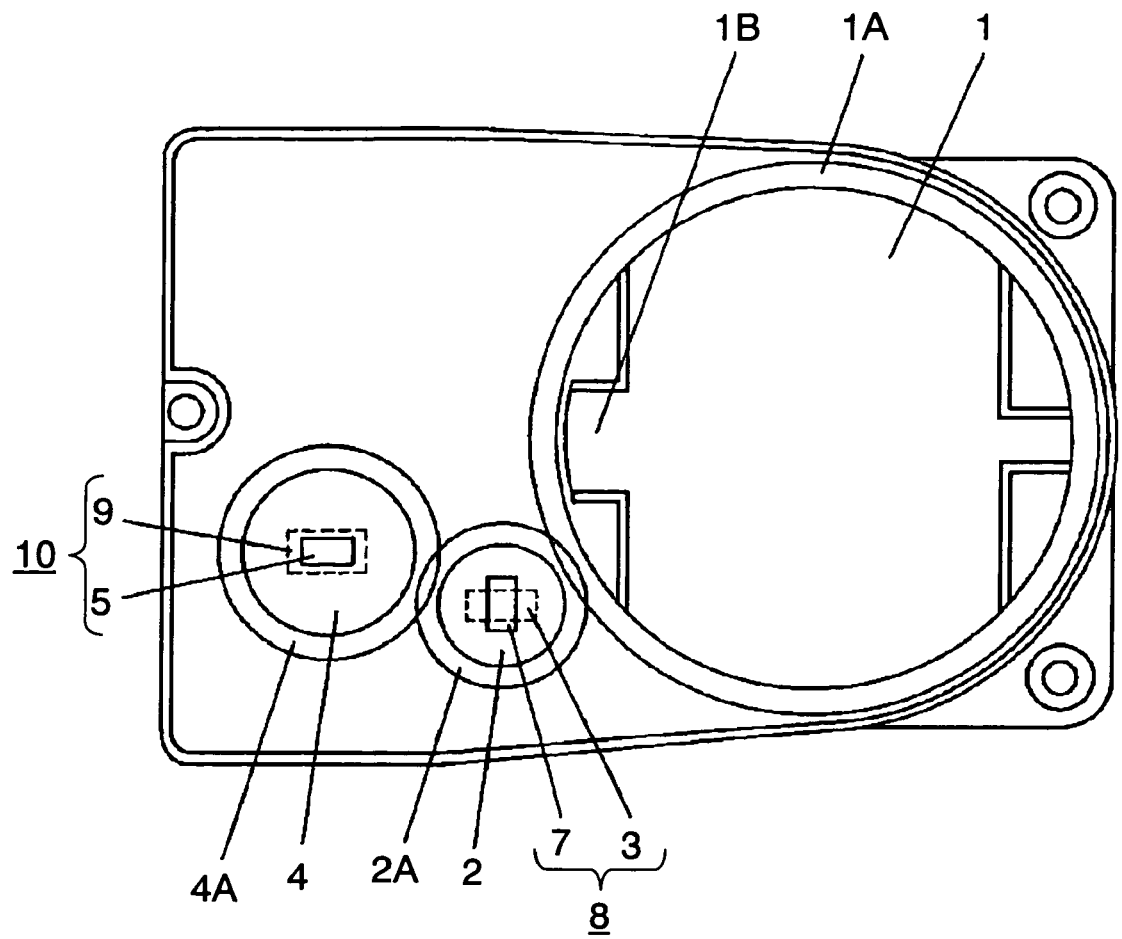
FIG. 4 is a plan view illustrating a conventional rotation angle detector.
Figure 5:
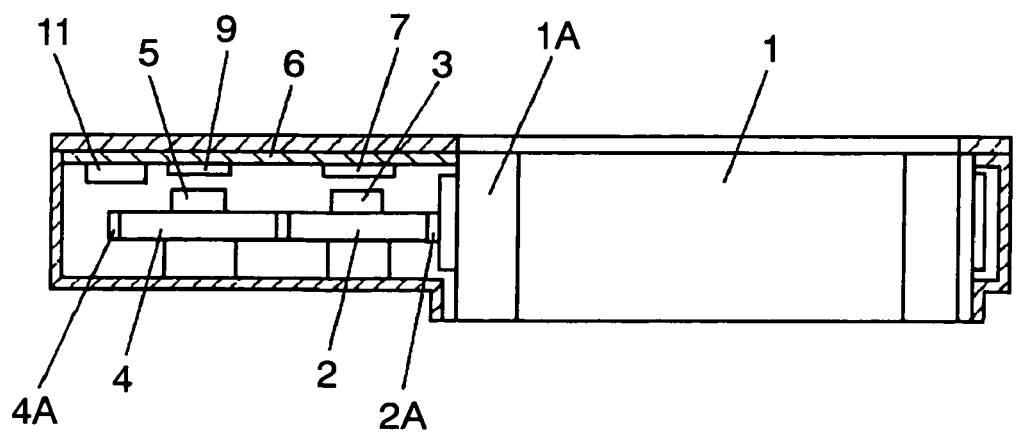
FIG. 5 is a section view of the conventional rotation angle detector.

Rotating first and second detectors 2, 4 and auxiliary detector 21 also rotates magnets 3, 5, and 22 attached to each center of the detectors. Through the rotation, magnetic lines of force of magnets 3, 5, and 22 change the direction, which are detected by magnetic sensors 7, 9, and 24, respectively, as detecting signals having voltage waveforms with a sine curve or cosine curve. Each of the detecting signals is processed to a saw tooth-shaped data waveform, as shown in FIG. 3 (where, the horizontal axis represents the rotation angle of rotator 1, and the vertical axis represents angles of each detector that repeatedly change in a maximum range of 180°). The triangular pulse train is fed to controller 26.

Suppose that first detector 2 has one-third the number of teeth with respect to rotator 1, first detector 2 has three turns for one complete turn of rotator 1. Magnetic sensor 7 detects two highs and two lows of magnetic force for one complete turn of first detector 2, so that the data waveform detected at first rotation-detecting section 8 exhibits 6-repeated deltas shown as data waveform 41 at the top of FIG. 3.

Second detector 4 rotates slightly slower than first detector 2; the data waveform detected at second rotation-detecting section 10 exhibits 5-odd deltas as data waveform 42 shown in the middle of FIG. 3. Data waveform 42 has a different cycle, and has a different phase with respect to data waveform 41. Auxiliary detector 21 has a number of teeth fewer than first and second detectors 2, 4, and therefore rotates faster than the two detectors. The data waveform of auxiliary rotation-detecting section 25 exhibits nearly 7 deltas shown as data waveform 43 at the bottom of FIG. 3. Data waveform 43 has a different cycle, and a different phase with respect to data waveforms 41 and 42.

For example, when the steering is turned 90° clockwise, i.e., when rotation angle θ of rotator 1 takes 90°, controller 26 detects the detecting signals as follows: angle data 41A from first rotation-detecting section 8; angle data 42A from second rotation-detecting section 10; angle data 43A from auxiliary rotation-detecting section 25. Receiving the signals, controller 26 calculates a tentative rotation angle of rotator 1 from angle data 41A of first rotation-detecting section 8, angle data 42A of second rotation-detecting section 10, and each number of teeth of spur gear 2A of first detector 2 and spur gear 4A of second detector 4, and determines value θ1, for example, to be 90°.

Next, controller 26 calculates another tentative rotation angle of rotator 1 from angle data 43A of auxiliary rotation-detecting section 25 and angle data 42A of second rotation-detecting section 10, and determines value θ2, for example, to be 90.5°; similarly, controller 26 determines still another value θ3 to be 89.5° from angle data 43A and 41A.

Comparing θ1 with θ2 and θ3, controller 26 checks whether or not the values are in a predetermined range, or whether or not each difference between the values is in a predetermined range. When the predetermined range is defined to be within 1.5°, controller 26 determines that the value calculated from the detecting signals of first and second rotation-detecting sections 8 and 10 (i.e., θ1=90°) is valid, and outputs value θ1 to the electronic circuits of the car as rotation angle θ of rotator 1.

Controller 26 calculates values θ1, θ2, and θ3 as tentative angle of rotator 1 according to combinations of each detecting signal from first rotation-detecting section 8, second rotation-detecting section 10, and auxiliary rotation-detecting section 25. When the calculated values are within a predetermined range, controller 26 determines value θ1 (obtained from first and second rotation-detecting sections 8 and 10) to be angle θ of rotator 1. If a problem occurs in the detecting sections—coming-off or breakage in the gear sections, and other failures in rotation-detecting sections, θ1, θ2, and θ3 have considerably different values. Through the calculation result, controller 26 can easily find something wrong in the detector.

Here will be described the reason why value θ1—obtained by first and second rotation-detecting sections 8 and 10—is used for the final judgment on angle θ of rotator 1. Wobbling caused by the engagement between the steering shaft and rotator 1 and fluctuations of the rotation of rotator 1 easily cause wobble in the rotation of first detector 2 and auxiliary detector 22. That is, values θ2 and θ3 likely have errors. On the other hand, engagement between first detector 2 and second detector 4, by virtue of their smaller diameter and number of teeth, has few wobble, and therefore value θ1 has few errors.

Even when the steering is accidentally rotated after the engine is stopped, i.e., during the condition without power supply, controller 26 compares the three values θ1, θ2, and θ3 when power supply is fed to the rotation angle detector by the restarted engine so as to detect a failure in the detectors or rotation-detecting sections. That is, the rotation angle detector has no need to have power supply while the engine is out of operation, contributing to energy saving.

If at least one of θ1, θ2, and θ3 does not fall within the predetermined range, controller 26 does not output rotation angle θ to the electronic circuits of the car, and instead, outputs a warning signal indicating malfunction expected in the detectors. The warning signal should preferably call the driver's attention to the malfunction by blinking an alarm lamp or showing warning sign on a display.

According to the rotation angle detector of the embodiment, as described above, first detector 2, second detector 4, and auxiliary detector 21 rotate at a different speed. Receiving each detecting signal from first and second rotation-detecting sections 8 and 10; from second rotation-detecting section 10 and auxiliary rotation-detecting section 25; and from first rotation-detecting section 8 and auxiliary rotation-detecting section 25, controller 26 calculates three tentative angles, θ1, θ2, and θ3. If θ1, θ2, and θ3 fall within a predetermined range, controller 26 outputs θ1 as rotation angle θ of rotator 1; otherwise, controller 26 does not output rotation angle θ. With the structure above, the rotation angle detector can detect unusual value as a rotation angle so as not to output incorrect data. A simple structured rotation angle detector capable of detecting the rotation angle with accuracy can thus be obtained.

If any one of θ1, θ2, and θ3 does not fall within the range, controller 26 outputs a warning signal, calling the driver's attention to an abnormal condition of the rotation angle detector.

Although the description above introduces the structure in which controller 26 employs three values of θ1, θ2, and θ3 for determining the rotation angle, two-value-judgment is possible. In this case, when the two values are in the predetermined range, controller 26 outputs θ1 as rotation angle θ of rotator 1. Compared to the judgment with three values, two-value-judgment has less accuracy, but can further simplify the structure of controller 26.

In the description above, second detector 4 rotates at the slowest speed, first detector 2 comes next, and then auxiliary detector 21 follows. However, according to the shape or size of the rotation angle detector, the number of teeth and the rotation speed of the detectors can be flexibly determined as long as the tentative rotation angle can be obtained by calculation.

Although the description above introduces the rotation angle detector having a structure in which rotator 1, first detector 2, second detector 4, and auxiliary detector 21 have a spur gear on each perimeter and rotate with the spur gears meshed, it is not limited thereto; the present invention is applicable to the structure having differently sized rotator and detectors each of which has a surface with unevenness or high friction on the perimeter, instead of the spur gears.

The rotation angle detector of the present invention, as described above, can detect unusual value as a rotation angle so as not to output incorrect data. A simple structured rotation angle detector capable of detecting the rotation angle with accuracy can thus be obtained. The structure is particularly useful in detecting the rotation angle of the steering of a car.

What is claimed is:

1. A rotation angle detector, comprising:
   a rotator that rotates in engagement with an object;
   a first detector that rotates in engagement with the rotator;
   a second detector that rotates in engagement with the first detector;
   a first rotation-detecting section for detecting a rotation of the first detector;
   a second rotation-detecting section for detecting a rotation of the second detector;
   an auxiliary detector that rotates in engagement with the rotator;
   an auxiliary rotation-detecting section for detecting a rotation of the auxiliary detector; and
   a controller for detecting the rotation angle of the rotator from detecting signals fed from the first rotation-detecting section and the second rotation-detecting section, wherein, the first detector, the second detector, and the auxiliary detector each rotate at a different speed, the controller receives each detecting signal from i) the first rotation-detecting section and the second rotation-detecting section; ii) the second rotation-detecting section and the auxiliary rotation-detecting section; and iii) the first rotation-detecting section and the auxiliary rotation-detecting section to calculate at least two tentative values for the rotation angle, the controller employs the detecting signal received from the first rotation-detecting section and the second rotation-detecting section for detecting the rotation angle of the rotator when the calculated values are within a predetermined range.

2. The rotation angle detector of claim 1, wherein the controller outputs a warning signal when any one of the tentative values for the rotation angle does not fall within the predetermined range.

* * * * *